(12) United States Patent
Dorneanu

(10) Patent No.: US 10,425,703 B2
(45) Date of Patent: Sep. 24, 2019

(54) REMOTE MONITORING AND REPORTING FOR MOBILE PLURAL COMPONENT MANUFACTURING RIGS

(71) Applicant: Daniel Dumitru Dorneanu, Charleston, SC (US)

(72) Inventor: Daniel Dumitru Dorneanu, Charleston, SC (US)

(*) Notice: Subject to any disclaimer, the term of this patent is extended or adjusted under 35 U.S.C. 154(b) by 8 days.

(21) Appl. No.: 15/933,333

(22) Filed: Mar. 22, 2018

(65) Prior Publication Data

US 2018/0279021 A1  Sep. 27, 2018

Related U.S. Application Data

(60) Provisional application No. 62/474,657, filed on Mar. 22, 2017.

(51) Int. Cl.
*G06Q 10/06* (2012.01)
*H04Q 9/00* (2006.01)
*G06Q 50/04* (2012.01)

(52) U.S. Cl.
CPC ....... *H04Q 9/00* (2013.01); *G06Q 10/063114* (2013.01); *G06Q 50/04* (2013.01); *H04Q 2209/40* (2013.01); *Y02P 90/30* (2015.11)

(58) Field of Classification Search
CPC .................. H04Q 9/00; G05B 15/02
USPC ............ 340/870.11; 702/182–183; 705/7.27
See application file for complete search history.

(56) References Cited

U.S. PATENT DOCUMENTS

2018/0329436 A1* 11/2018 Auberg .................. G05B 15/02

* cited by examiner

*Primary Examiner* — Albert K Wong
(74) *Attorney, Agent, or Firm* — Daniel D. Dorneanu; PSF R&D Labs

(57) ABSTRACT

SPF (spray polyurethane foam) insulation applied in a commercial or residential building is the only building product which is manufactured on-site and not in a controlled in-plant environment. One reason for the high cost of SPF is that application of SPF requires large investment capital equipment and a specialized crew for each job. The work is further complex because the crew of each rig manufactures and installs the plural component product with little or no technical off-site guidance or support. We worked to solve this problem by designing a remote monitoring and reporting system which sends live raw parameter data from the spray rig to a support center server. The support center processes the data and provides rig support through our 4 pillars of technology. We designed the system to interface with all proportioner brands used by contractors keeping the user interface and majority of components standard for all. Using our system, the rig crew can optimize their performance and the performance of the equipment. Using our system, the average spray rig can improve productivity by 15-20% per job.

4 Claims, 3 Drawing Sheets

| | | | |
|---|---|---|---|
| A | Proportioner | J | Fluid Supply Lines |
| B | Heated Hose | K | Feed Pumps |
| C | Fluid Temperature Sensor | L | Agitator |
| D | Heated Whip Hose | M | Desiccant Dryer |
| E | Spray Gun | N | Bleed Lines |
| F | Gun Air Supply Hose | P | Gun Fluid Manifold |
| G | Feed Pump Air Supply Lines | S | Remote Display Module |
| H | Agitator Air Supply Line | | |

| JobSight SKY Rig Log: Truck 8750 |||||||||||
|---|---|---|---|---|---|---|---|---|---|---|
| | | | | September 6 2017 3:12pm |||||||
| Live: | Pa: 1425 | Pb: 1310 | Ta: 128 | Tb: 128 | Th: 126 | Va: 32 | Vb: 27 | Fa: 2.91 | R: 2.1 | Y: 3.3 |
| Live: | • | • | ○ | • | • | Pc: 188 | Pc: 160 | Fb: 2.93 | Ta: 72 | Tb: 74 |
| | | OC | CC | HRS | Depth | Difficulty | | | | |
| | Target: | 60 | 0 | 8 | 3.5 | 5 | | OSE: | 72.58% | |
| Goal | Time | Cycles | Pdelta | Q-ratio | Yield | Q-sight | MC | | Notes ||
| 0 | 7:05 | | | | | | | | | |
| 277 | 8:05 | 233 | 150-175 | 2.2-2.4 | NA | 3.6 | 105 | gun side seal gunk on A ||
| 555 | 9:05 | 504 | 200-250 | 2.4-2.6 | NA | 3.9 | 104 | catching up ||
| 832 | 10:05 | 745 | 250-300 | 2.6-2.8 | NA | 3.3 | 99 | | |
| 1109 | 11:05 | 1012 | 300-350 | 2.8-3.0 | 8.11 | 3.5 | 98 | stopped to replace oring ||
| 1247 | 12:05 | 1234 | 150-175 | 2.0-2.1 | 9.3 | 3.7 | 99 | lunch ||
| 1525 | 1:05 | 1523 | 150-175 | 2.0-2.1 | NA | 3.8 | 104 | jose kicking butt..... ||
| 1801 | 2:05 | 1820 | 150-175 | 2.0-2.1 | NA | 3.5 | 107 | | |
| 2078 | 3:05 | 2090 | 150-175 | 2.0-2.1 | NA | 3.6 | 110 | catching up ||

Figure 5

| JobSight SKY Fleet Status |||||||||||
|---|---|---|---|---|---|---|---|---|---|---|
| | | | | September 6 2017 10:12am |||||||
| Rig | Pa:Pb Range | Goal | Th | Cycles | C 2 Goal | Q-ratio | Yield | MC | OSE% | Status |
| Truck 6123A | 100-125 | 1200 | 128 | 435 | -17 | 2.1 | 107 | 107 | 73 | Spraying |
| Truck 6123B | 130-150 | 1125 | 132 | 345 | -75 | 3.2 | 105 | 115 | 56 | Spraying |
| Truck 2383A | 270-350 | 870 | 131 | 410 | 89 | 1.5 | 112 | 98 | 34 | Spraying |
| Truck 2384A | 100-150 | 1378 | 90 | 345 | 35 | na | 50 | 97 | 62 | Idle |
| Truck 2384B | 12/15 | 789 | 98 | 7 | -350 | na | na | na | | |
| Truck 2387A | na/na | na/na | na | na | na | na | na | na | na | Offline |
| Truck 2387B | 100-200 | 1030 | 127 | 333 | 23 | 3.3 | na | 98 | 65 | Spraying |

Figure 6

REMOTE MONITORING AND REPORTING FOR MOBILE PLURAL COMPONENT MANUFACTURING RIGS

This application claims the benefit of U.S. Application No. 62/474,657 filed Mar. 22, 2017 titled Spray Foam Insulation Assisted Spray Technology. The contents of which are hereby incorporated by reference.

TECHNICAL FIELD

Polyurethane Spray Foam Insulation

BACKGROUND

SPF (spray polyurethane foam) insulation applied in a commercial or residential building is the only building product which is manufactured on-site and not in a controlled in-plant environment. The application is done using a plural component proportioner. The proportioner is a machine used to heat and pressurize the two (2) chemicals required for the exothermic reaction process which produces SPF (spray polyurethane foam) insulation. The two (2) chemicals travel through the spray hose (FIG. 1: part B) to the spray gun (FIG. 1: part E) where the sprayer is performing the work. The proportioner is part of a spray foam rig which is run by a crew. The crew typically consists of 4 people who spray an average of one set of foam per day (FIG. 1 A-ISO, B-RES 55 gal drums.) Spray foam rigs today operate based on live decisions made by the crew with little data driven guidance and typically independent of input from the operations office. Our company saw the need to supplement our daily operation with a remote offsite 360-degree data driven support system.

PRIOR ART

On the market today, in the SPF application field the only product based on data which exists to help guide daily operations is Graco Insite which operates with one single specific spray foam proportioner and provides a specific monitoring functionality (displaying raw data.) This system gathers parameter data from the rig (proportioner status, volume sprayed, temperature and pressure values) and sends the data to an offsite server. The operations manager for the company can then connect to the server and access the raw data for each of his rigs. The operations manager can then make strategic decisions and relay this to each rig crew. Problem—This process inherently suffers from a great time delay to gather/process/relay the info, additional personnel needed, and availability of only raw proportioner data (temp, pressure, etc.)

SUMMARY OF THE INVENTION

Our company built a remote monitoring and reporting system which sends live raw parameter data from each critical piece of equipment of the spray rig to a support center server. The support center server processes the raw data and provides rig support through our 4 pillars of technology. The 4 pillars of the system are WSE (workday strategy evaluation) PEE (performance and efficiency evaluation) OSE (overall spray efficiency) and QAM (quality assurance management.) Using this system, the rig crew can operate as a "manufacturing facility" and can optimize their performance and the performance of the equipment to achieve the set operational and quality targets. Solution—Our product innovation allows the spray foam rig to operate using comprehensive processed data support relevant to all critical equipment on the spray rig (proportioner(s), compressor(s), generator(s) and fresh air supply(s.) External support from an operations center applies standardized tools across all spray foam rigs to monitor, evaluate and benchmark the raw data. The result is usable strategic, diagnostic and qualitative input which the crew on the spray foam rig can use on the jobsite throughout the workday.

BRIEF DESCRIPTION OF DRAWINGS

FIG. 5 shows a rig log of the sprayer's workday with historical parameter data.

FIG. 6 shows a remote server log with historic and live parameter data of multiple rigs spraying.

DETAILED DESCRIPTION OF INVENTION

Figure 1:
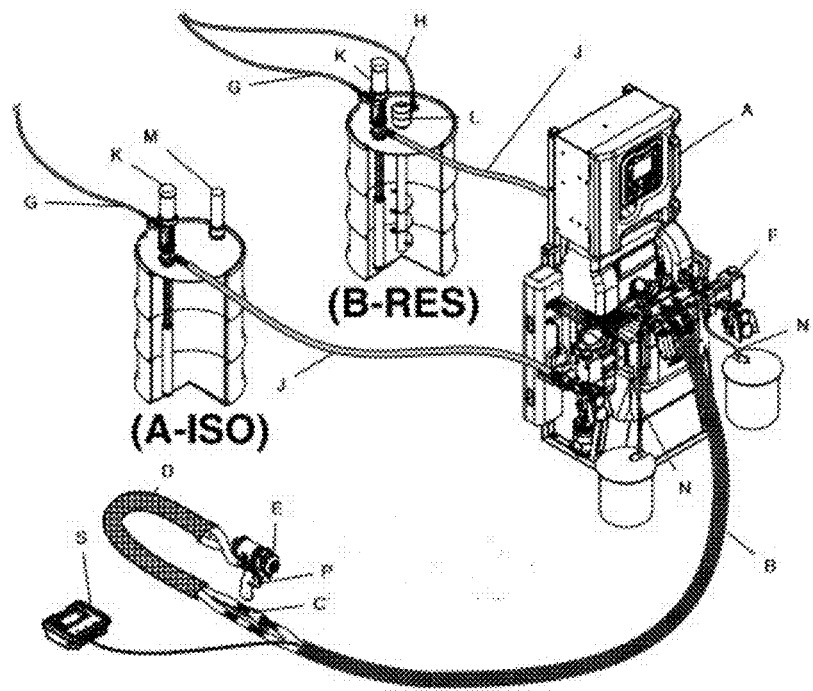
FIG. 1 shows typical main components of a spray foam rig. Person spraying is at the end of the hose (B) and spraying with gun (E).
Figure 2:
FIG. 2 shows the point of use (POU) area where we spray.
Figure 3:
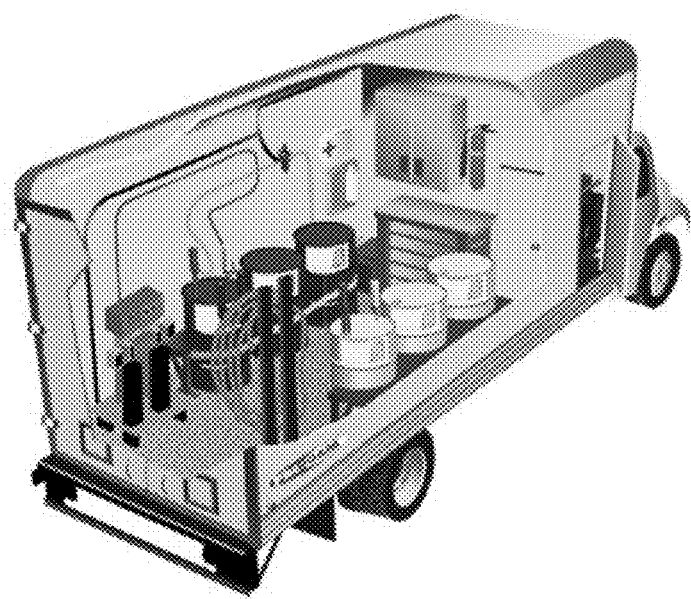
FIG. 3 shows the components from FIG. 1 inside of a truck which is how many contractors operate. The truck parks next to the building to be sprayed. Spray hose is then rolled out inside the building to the areas to be sprayed (attic, walls, crawlspace, etc.)
Figure 4:
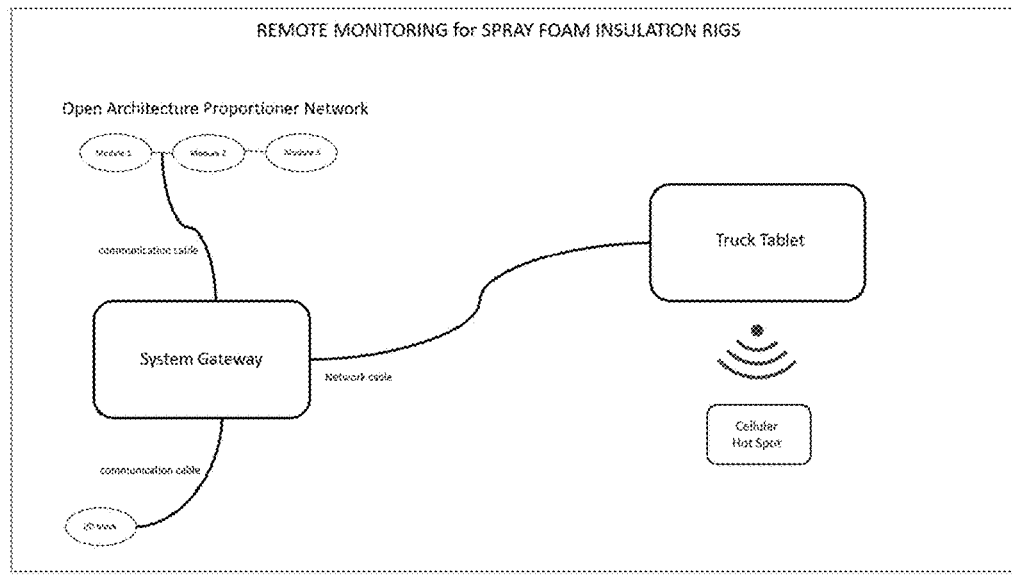
FIG. 4 shows a diagram of the system components.

Components of the system include the rig tablet, the gateway, and the support center remote server. The gateway is connected to the proportioner network and also with the rig tablet using a communication cable (FIG. 4.) The tablet communicates with the remote server via a cellular hot spot. Software applications on rig tablet and remote server utilize the following 4 pillars of provisional U.S. Application No. 62/474,657: Spray Foam Insulation Assisted Spray Technology.

WSE: workday strategy evaluation. This pillar breaks down the workload for each day into sections, each associated with an allotted time and material. One data input comes from the operations office in terms of section square footage, depth, time targets, material targets. The crew can then view their workday as a roadmap with set targets for each itinerary of the trip. WSE also provides input on lunch and break times based on drum changes, planned equipment maintenance and un-planned repairs needed.

PEE: performance and efficiency evaluation. This includes the material yield optimization tool and pressure differential trend tool.

OSE: overall spray efficiency. This number expressed in a percent represents the overall performance of that rig. The calculation is comprehensive of the rig material sprayed hourly goals, the actual material sprayed, the material spray depth, and the job difficulty level. 100% is maximum. As a reference value, a rig operating at an average 85% OSE is considered an industry benchmark rig.

QAM: quality assurance management. This tool receives input from the A and B material flow meters, pressure transducers and thermocouples. QAM tool calculates a material ratio which combined with the pressure and temperature data can evaluate if ISO and Resin exothermic reaction mix is performed to the manufacturer specifications.

Applications:

Development of the two software applications was done using Unity 3D, a versatile development platform allowing final application to be run on multiple operating systems. Unity engine allowed for interface with existing devices without need for an existing API or SDK (for example wearables new on the market.)

Gateway:

The communication gateway receives serial messages on the open architecture proportioner network. The gateway is the only device in the system which can vary between proportioner brand families based on network communication protocol. Messages received are translated into the displayed parameters. The gateway can also communicate to I/O block(s) connected directly to the proportioner and other rig equipment counters, proximity sensors, analog transducers, thermocouples, flow meters or temperature controllers.

Local Functionality:

The software application allows for viewing of SPF (spray polyurethane foam) proportioner and other rig equipment parameters, an hour by hour job progression log, an electronic work order interface, a diagnostics interface and a material consumption interface. The hour by hour progression log (FIG. 5) of the sprayers workday (described in provisional U.S. Application No. 62/474,657: Spray Foam Insulation Assisted Spray Technology) tracks the sprayers hour by hour job progress and populates historical parameter data along the way such as showing material Ratio variance each hour. The sprayer can also make use of the log to see if he is ahead or behind schedule at any point during the workday. At the end of the workday, the job log serves as a historical summary of that specific job at that specific worksite. The electronic work order interface is a summary of the specific job that the rig is assigned. This data is inclusive of all details pertaining to the job including square footage, material depth, areas to be sprayed, specific tools to be used, etc. The diagnostics interface consists of flags and alarms intended to prevent an equipment breakdown or quality deficiency. It also assists in troubleshooting in the event of an un-planned breakdown. Lastly the material consumption interface allows the rig crew to see if current job is on-track or not on-track to achieve the allocated material consumption target for that job.

Remote Functionality:

A fleet of rigs can be monitored using the support center remote server software application. The remote server processes the raw data and provides rig support through our pillars of technology. The user interface (FIG. 6) allows operations management to access the fleet statistics and escalate priority information to each rig crew or provide specialized support as needed. The operations manager can also use the fleet data to make strategic operational decisions relevant to other scheduled jobs.

Similar functionality can be achieved when interfacing with proportioners which make use of other open architecture communication protocols such as RS-485, CAN Open, ModBus, DeviceNet, Profibus, etc. by making use of corresponding gateway. Similar functionality can be achieved when interfacing with proportioners which make only partial use or do not use a communication network by making use of a gateway which connects to an I/O block connected directly to the proportioner analog transducers, thermocouples, flow meters or temperature controllers.

The invention claimed is:

1. A spray foam remote monitoring system, comprising:
a portable computer for receiving parameters from a spray foam rig wherein the spray foam rig has a communication interface and measures and sends parameters relating to the application of foam, including at least a volume of foam sprayed, a pressure, and a temperature, the portable computer including a progress log, wherein the portable computer receives the parameters from the rig and determines an amount of foam sprayed, and wherein the portable computer outputs to a user of the rig a progress of a job and an overall spray efficiency based on the amount of foam sprayed and the progress log;
a network coupled to the portable computer; and
an operations center coupled to the network to receive the parameters from the portable computer to allow remote monitoring of the rig and the user.

2. The spray foam monitoring system in claim 1, where the progress of the job is determined on an hourly or a daily basis.

3. The spray foam monitoring system in claim 1, further comprising at least one additional portable computer wherein each portable computer receives parameters from its respective rig, and wherein the operations center receives parameters from all of the rigs via the portable computers and the network.

4. The spray foam monitoring system in claim 1, wherein the portable computer further receives from the rig a rate of foam sprayed and the portable computer determines a quality of the foam being sprayed from the rate of foam sprayed and the parameters.

* * * * *